United States Patent
Takeo et al.

(10) Patent No.: US 7,791,829 B2
(45) Date of Patent: Sep. 7, 2010

(54) APPARATUS FOR ASSISTING WRITE OPERATION USING HIGH FREQUENCY MAGNETIC FIELD IN DISK DRIVE

(75) Inventors: Akihiko Takeo, Tachikawa (JP); Junichi Akiyama, Kawasaki (JP); Kenichiro Yamada, Tokyo (JP); Hitoshi Iwasaki, Yokosuka (JP); Masayuki Takagishi, Kunitachi (JP); Tomomi Funayama, Tokorozawa (JP); Masahiro Takashita, Yokohama (JP); Mariko Shimizu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 197 days.

(21) Appl. No.: 12/196,628

(22) Filed: Aug. 22, 2008

(65) Prior Publication Data

US 2009/0059417 A1 Mar. 5, 2009

(30) Foreign Application Priority Data

Sep. 5, 2007 (JP) ............................. 2007-230475

(51) Int. Cl.
G11B 5/02 (2006.01)
(52) U.S. Cl. ............................. 360/55; 360/59; 360/75; 360/313
(58) Field of Classification Search ........................ None
See application file for complete search history.

(56) References Cited

U.S. PATENT DOCUMENTS

| 6,785,092 B2 | 8/2004 | Covington et al. |
| 6,982,845 B2 | 1/2006 | Kai et al. |
| 2005/0219771 A1 | 10/2005 | Sato et al. |
| 2008/0112087 A1* | 5/2008 | Clinton et al. ............... 360/317 |
| 2008/0137224 A1* | 6/2008 | Gao et al. ...................... 360/55 |

OTHER PUBLICATIONS

Xiaochun Zhu, et al., "Bias-Field-Free Microwave Oscillator Driven by Perpendicularly Polarized Spin Current," IFEE Transactions on Magnetics, vol. 42, No. 10, Oct. 2006.

* cited by examiner

*Primary Examiner*—Jason C Olson
(74) *Attorney, Agent, or Firm*—Knobbe, Martens, Olson & Bear LLP

(57) ABSTRACT

According to one embodiment, a disk drive having a spin torque oscillator and designed to perform high frequency assisted writing. The disk drive has a magnetic disk, a magnetic head, a coil, and a drive current controller. The drive current controller controls a drive current to supply to the spin torque oscillator. To record data magnetically in the disk, the drive current controller supplies to the spin torque oscillator the drive current that changes in synchronism with the polarity inversion of the recording current supplied to the coil, which excites the recording magnetic pole of the magnetic head.

12 Claims, 12 Drawing Sheets

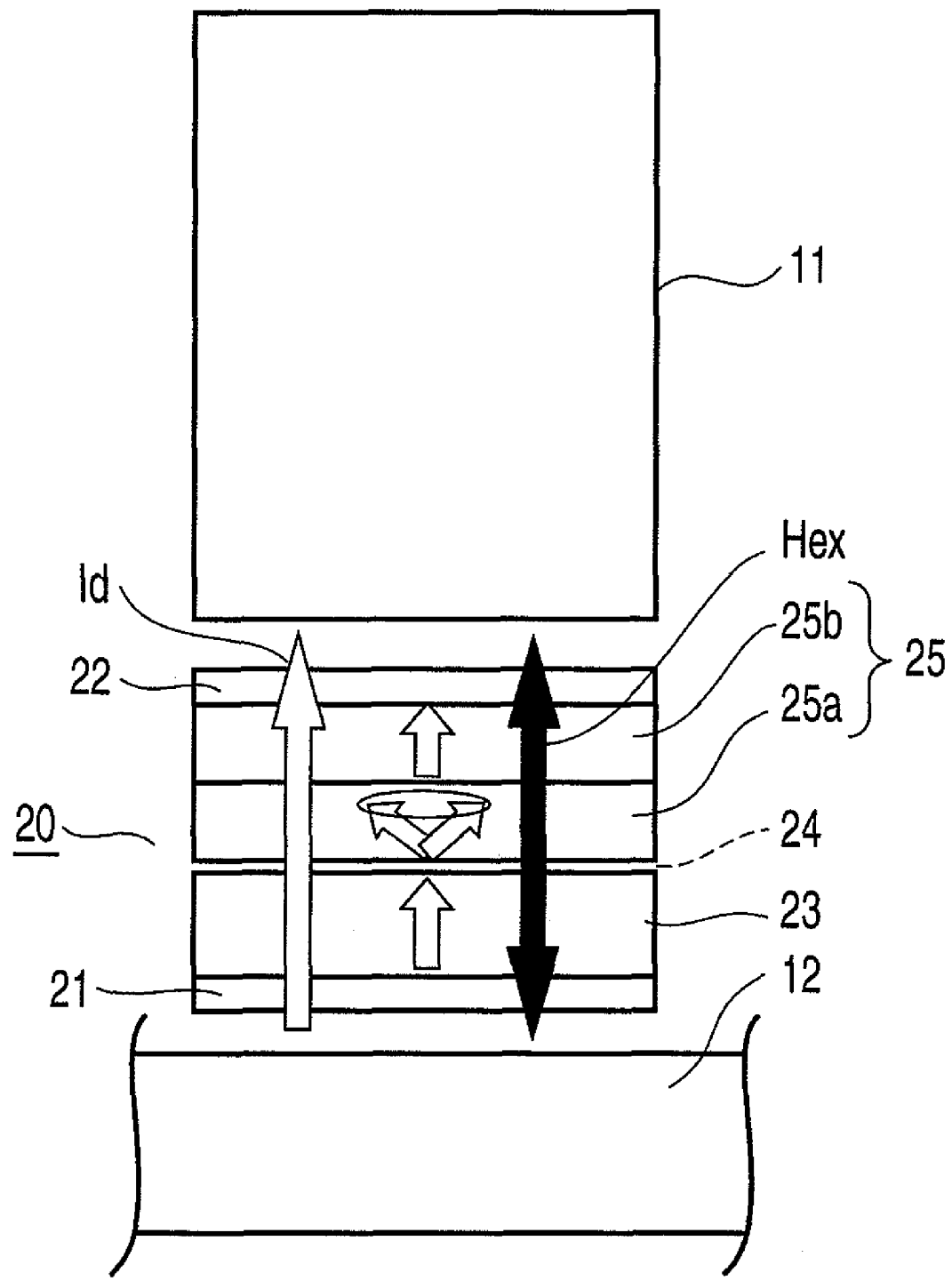
F I G. 4

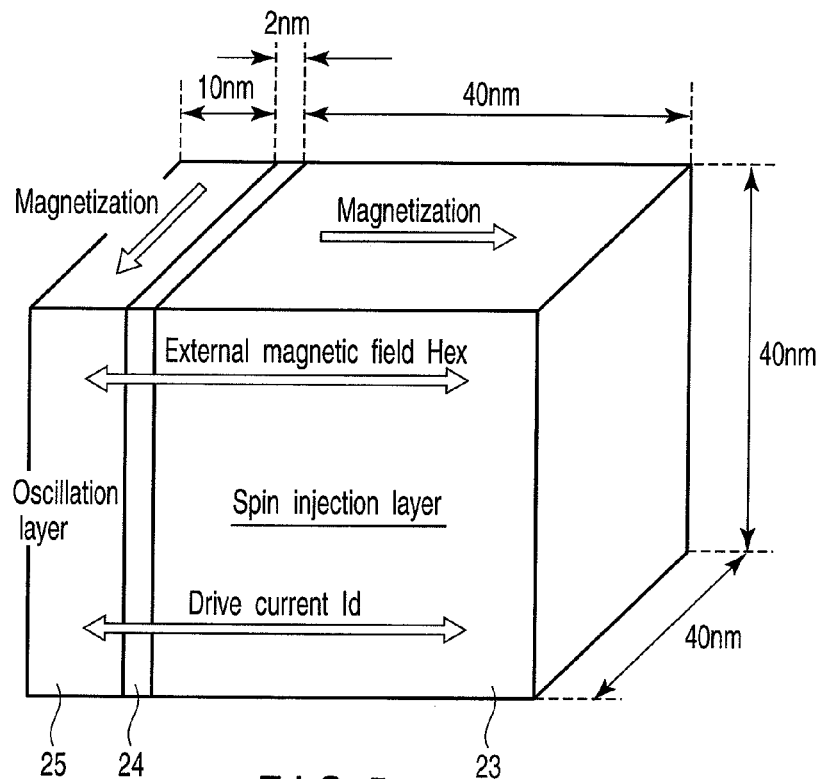

FIG. 5

| | Saturated magnetization magnetic-flux density Ms | 900emu / cc |
|---|---|---|
| Oscillation layer 25 (aligned in longitudinal direction) | Anisotropic magnetic field Hk | 1Oe |
| | Size | 40nm X 40nm X 10nm (thickness in the direction of laminating layers) |
| Spin injection layer 23 (aligned in perpendicular direction) | Saturated magnetization magnetic-flux density Ms | 900emu / cc |
| | Anisotropic magnetic field Hk | 70000 Oe |
| | Size | 40nm X 40nm X 40nm |
| Non-magnetic layer 24 | Thickness | 2nm |
| | Exchange coupling force | 0 |
| | Spin polarization ratio (transmission) | 0.6 |
| | Spin polarization ratio (reflection) | 0.3 |

FIG. 6

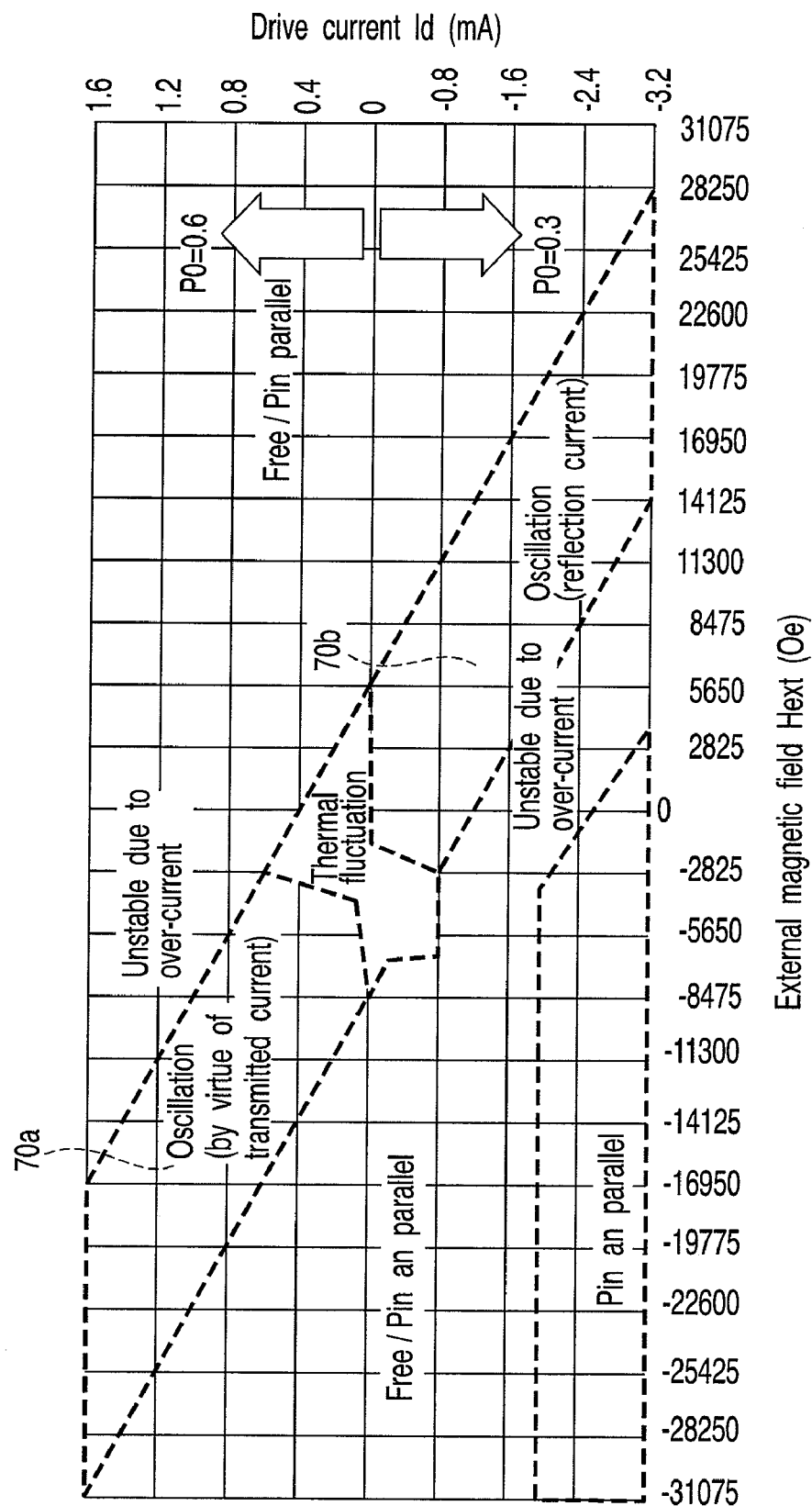
F I G. 7

APPARATUS FOR ASSISTING WRITE OPERATION USING HIGH FREQUENCY MAGNETIC FIELD IN DISK DRIVE

CROSS-REFERENCE TO RELATED APPLICATIONS

This application is based upon and claims the benefit of priority from Japanese Patent Application No. 2007-230475, filed Sep. 5, 2007, the entire contents of which are incorporated herein by reference.

BACKGROUND

1. Field

One embodiment of the present invention relates to a disk drive that employs an assisted writing method using a high-frequency magnetic field.

2. Description of the Related Art

In the field of disk drives, a representative example of which is a hard disk drive, magneto-resistive (MR) elements and giant magneto-resistive effect (GMR) elements have recently been put to practical use as read-head elements for use in magnetic heads. The MR element and the GRM element have remarkably increased the recording capacity of the disk drive. Further, the ultra-high recording density in the disk drive is promoted by utilizing perpendicular magnetic recording, because perpendicular magnetic recording can, in principle, achieve a higher recording density than longitudinal magnetic recording.

However, the ultra-high recording density cannot be easily promoted due to the thermal fluctuation that is inherent to magnetic recording. As a magnetic recording method that may solve this problem, there has been proposed a so-called high frequency assisted writing method that uses a high-frequency magnetic field. (See, for example, U.S. Pat. No. 6,011,664 and U.S. Patent Application Publication No. 2005/0207050.)

This method is a technique of applying a magnetic field of a frequency much higher than the recording-signal frequency to a prescribed tiny part of a magnetic disk (hereinafter referred to as disk), thereby reducing the coercive force (Hc1) that part has in the recording-signal frequency region to half (Hc2) or less.

At the time the coercive force of the disk is thus reduced, a magnetic head applies a recording magnetic field to said part of the disk. Thus, data can be magnetically recorded on a disk that has high magnetic anisotropy energy (Ku) and, therefore, can record data at a higher density.

Some prior-art references disclose a method of applying a high-frequency magnetic field. More precisely, a high-frequency current is supplied to a coil coupled to a magnetic pole, exciting the magnetic pole and causing the pole to generate a high-frequency magnetic field, and this magnetic field is applied to a disk. This method has a problem, however. The smaller the part of the medium in which to record data is in order to increase the recording density, the more drastically the magnetic field that can be applied to the part will decrease. Consequently, the coercive force can hardly be reduced at the recording part, rendering it difficult to accomplish high frequency assisted writing.

In order to solve this problem, a method has been proposed in which a spin torque oscillator (STO) is used as source of a high-frequency magnetic field. (See, for example, U.S. Patent Application Publication No. 2005/0023938 and U.S. Patent Application Publication No. 2005/0219771.) The STO has, for example, a GMR element or a TMR (Tunneling Magneto-Resistive effect) element. The operating principle of the STO is as follows. When a current is supplied to the STO, the spin of the electrons passing through the spin-injection layer is polarized. The stream of the electrons thus polarized exerts a spin torque to the oscillation layer, magnetizing the oscillation layer. Thus magnetized, the oscillation layer undergoes ferromagnetic resonance, generating a high-frequency magnetic field.

An example of the STO is the microwave oscillator disclosed in Xiaochun Zhu and Jian-Gang Zhu, "Bias-Field-Free Microwave Oscillation Driven by Perpendicularly Polarized Spin Current," IEEE Transaction on Magnetics, Vol. 42, No. 10, October 2006.

The phenomenon that the oscillation layer generates a high-frequency magnetic field is prominent if the element size is equal to or less than tens of nanometers. Therefore, the area in which the high-frequency magnetic field emanating from the STO works is limited to within a radius of only tens of nanometers from the STO.

It is desired that the oscillation frequency of the STO be equal or nearly equal to the ferromagnetic resonance frequency of the recording layer of the disk. If the STO is arranged near the recording pole of the magnetic head and if the magnetic head is arranged close to and opposed to the disk, the high-frequency magnetic field generated by the STO can be applied to only the tiny recording part of the disk. As a result of this, only the coercive force at the tiny recording part can be reduced.

In the disk drive, the recording pole may apply a recording magnetic field to the recording part of the disk at the time the coercive force on the disk decreases. If the recording magnetic field is so applied, the recording part will undergo flux reversal, whereby data is written in the disk.

The STO consumes as little power and generate as little heat as the conventional GMG element or the conventional TMR element. In addition, any head that has an STO arranged near the recording pole can be manufactured in the same way as the conventional magnetic head. The manufacturing cost of the magnetic head having an STO would not increase so much. In view of this, the high frequency assisted writing method that uses an STO is promising as a magnetic recording method that may promote ultra-high recording density in disk drives.

However, the high frequency assisted writing method using an STO has been found to be disadvantage in the following respect.

In any magnetic head that has an STO, the oscillation layer of the STO is arranged near the recording pole. Inevitably, the leakage recording magnetic field emanating from the recording pole is applied to the oscillation layer, too. The oscillation frequency of the STO therefore fluctuates as the recording magnetic field changes. Consequently, the high-frequency magnetic field emanating from the STO destabilizes the reduction in the coercive force of the recording layer of the disk. This ultimately hinders stable, high-quality, high frequency assisted writing.

Hence, in order to achieve a uniform, stable high-density recording by using the high frequency assisted writing method, the oscillation frequency of the STO should be stable even if the recording magnetic field emanating from the recording pole changes.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is a diagram explaining the structure of the spin torque oscillator (STO) incorporated in the embodiment;

FIG. 5 is a diagram explaining a simulation model of the STO used in the embodiment;

FIG. 6 is a table showing various factors and components of the simulation model shown in FIG. 5;

FIG. 7 is a diagram representing the results of simulation performed on the simulation model;

DETAILED DESCRIPTION

Various embodiments according to the invention will be described hereinafter with reference to the accompanying drawings. In general, according to one embodiment of the invention, there is provided a disk drive that has a spin torque oscillator with a stable oscillation frequency and can therefore achieve stable, high-quality, high frequency assisted writing.

First Embodiment (Configuration of the Disk Drive)

Figure 1:
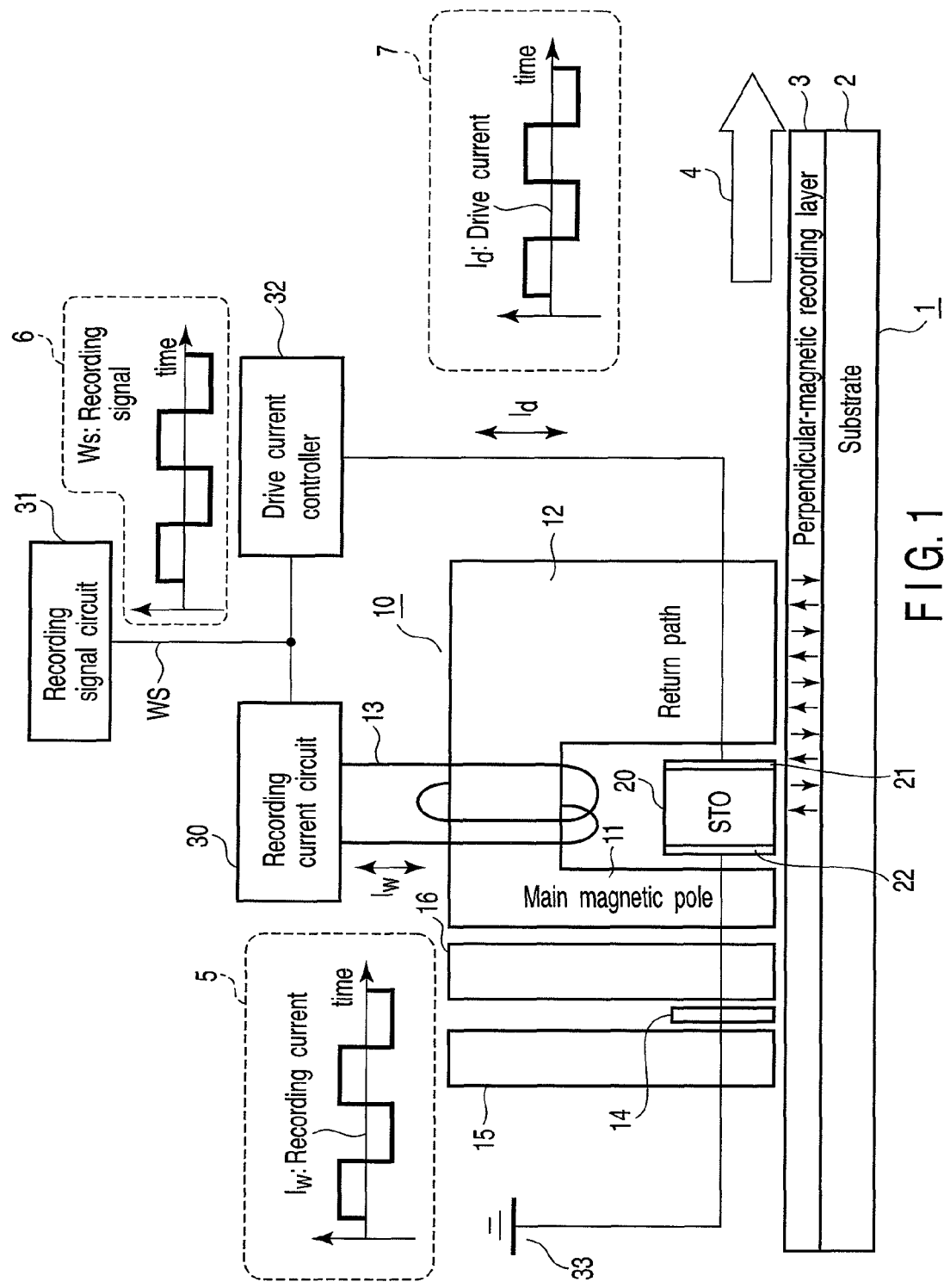
FIG. 1 is a diagram showing the major components of a disk drive according to a first embodiment of the present invention.
Figure 2:
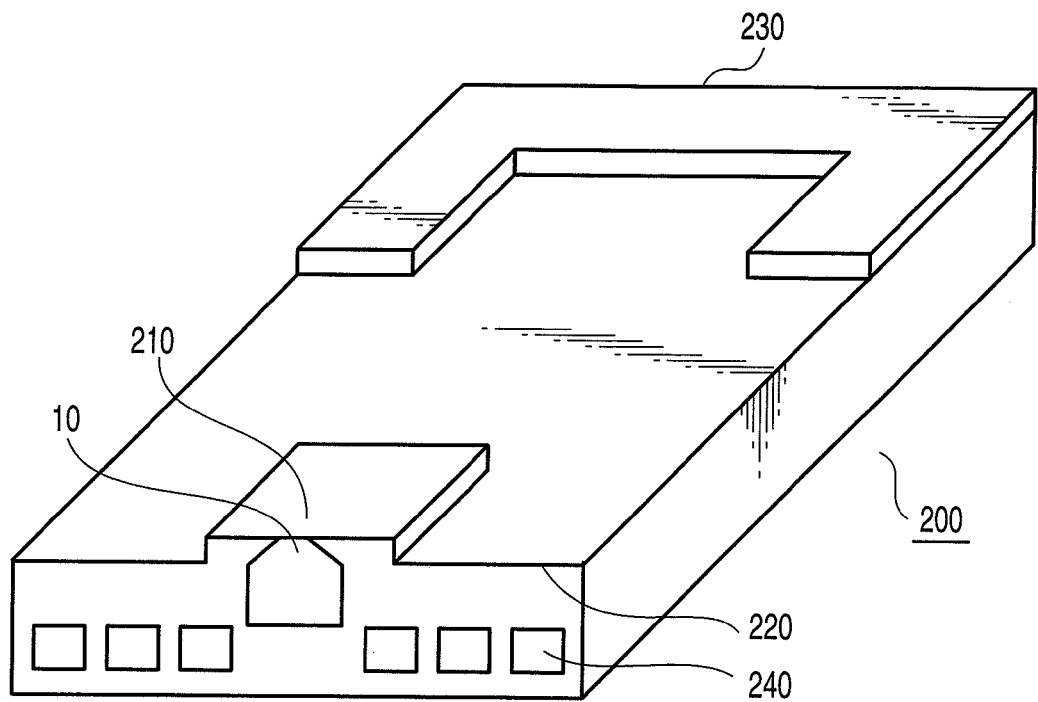
FIG. 2 is a diagram explaining the structure of the head slider according to the embodiment.
Figure 3:
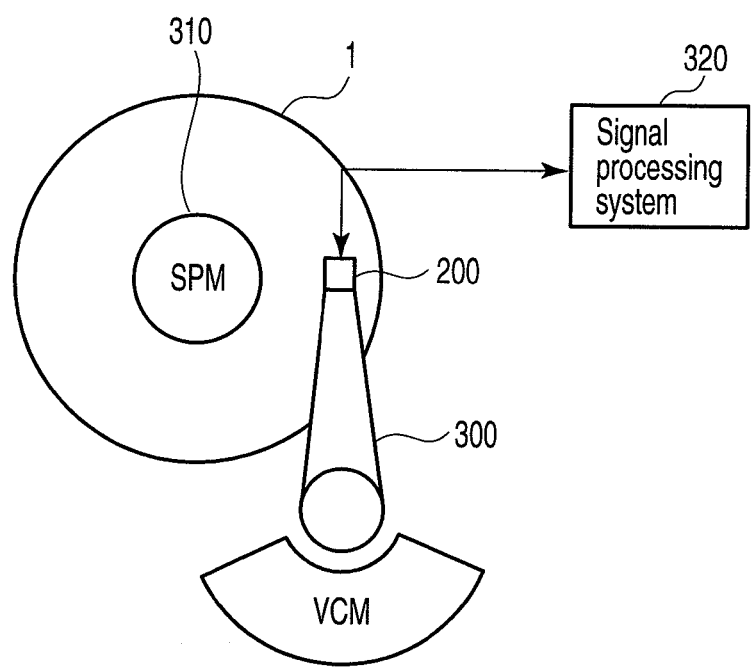
FIG. 3 is a diagram schematically illustrating the configuration of the disk drive according to the embodiment.

FIG. 1 is a diagram showing the major components of a disk drive according to a first embodiment of the present invention. FIG. 2 is a diagram explaining the structure of the head slider according to this embodiment. FIG. 3 is a diagram schematically illustrating the configuration of the disk drive according to this embodiment. FIG. 4 is a diagram showing the structure of the spin torque oscillator incorporated in the first embodiment.

The disk drive according to the present embodiment has a disk 1 and a magnetic head 10. The disk 1 is a perpendicular-magnetic recording medium. The magnetic head 10 has the function of performing high frequency assisted writing. As FIG. 2 shows, the magnetic head 10 is mounted on the distal end of a head slider 200 and located near a surface 210 that faces the disk 1.

The head slider 200 is made of a composite material composed of, for example, aluminum oxide ($Al_2O_3$) and titanium carbide (TiC). The head slider 200 is so designed and made that it can move relative to the disk 1, either flying over the disk 1 or contacting the disk 1. The head slider 200 has an air-outlet edge (trailing edge) 220 and an air-inlet edge (leading edge) 230. Air flows to the head slider 200 at the air-inlet edge 230 and flows from the head slider 200 at the air-outlet edge 220. The magnetic head unit 10 is arranged at the air-outlet edge 220, together with the bonding pads 240 that are connected to record-signal lines and power-supply lines.

As FIG. 3 shows, the disk 1 is secured to the shaft of a spindle motor (SPM) 310 and can therefore be rotated. The head slider 200 is mounted on an actuator 300 and can move over the disk 1 in the radial direction thereof. The actuator 300 is a head-moving mechanism that is driven by a voice coil motor (VCM).

The disk drive has a signal processing system 320 that includes various circuits configured to control and drive the magnetic head 10, as will be described later. The signal processing system 320 includes, in addition to the drive control circuit of the magnetic head 10, a microprocessor that controls some other components of the disk drive.

As shown in FIG. 1, the disk 1 comprises a substrate 2 and a perpendicular-magnetic recording layer 3 laid on the substrate 2. When applied with a magnetic field from the recording magnetic pole of the write head unit of the magnetic head 10, the perpendicular-magnetic recording layer 3 is controlled in terms of magnetization in the perpendicular direction. Data is thereby written in the disk 1. In FIG. 1, arrow 4 indicates the direction in which the disk 1 moves.

(Structure of the Magnetic Head)

The magnetic head 10 comprises two major components, i.e., a write head unit and a read head unit. The read-head unit has a read head element 14 interposed between magnetic shield layers 15 and 16 and can detect the direction in which the perpendicular-magnetic recording layer 3 of the disk 1 is magnetized. In other words, the read head unit can read magnetically recorded data from the disk 1. The read head element 14 is a GMG element or a TMR element, as in most cases, and is arranged between the magnetic shield layers 15 and 16, in order to enhance the playback resolution of the magnetic head 10.

The write head unit has a main magnetic pole 11, a return path (shield) 12, an excitation coil 13, and a spin torque oscillator (STO) 20. The main magnetic pole 11 constitutes the recording magnetic pole. The STO 20 has a first electrode 21 and a second electrode 22. The first electrode 21 is connected to a drive current controller 32. The second electrode 22 is connected to the ground. The read head element and the write head element are isolated by an insulator (not shown) made of, for example, alumina.

As shown in FIG. 4, the STO 20 is arranged near the recording magnetic pole and configured to apply a high-frequency magnetic field from an oscillation layer 25 to the perpendicular-magnetic recording layer 3 of the disk 1, thereby performing high frequency assisted writing. FIG. 4 schematically shows the head slider 200 as viewed from the surface (ABS surface) that is opposed to the disk 1.

As FIG. 4 shows, the STO 20 is a multi-layer structure, having a spin injection layer 23, a non-magnetic layer 24 and an oscillation layer 25, in addition to the first electrode layer 21 and the second electrode layer 22. The layers 21, 22, 23, 24 and 25 are laid, one on another. The first electrode layer 21 and the second electrode layer 22 are made of a material that has low resistivity and that does not easily oxidize, such as titanium (Ti) or copper (Cu). The non-magnetic layer 24 is made of material having high spin transmittance, such as copper (Cu), gold (Au) or silver (Ag).

The oscillation layer 25 is composed of a free layer 25a and a bias layer 25b. The spin injection layer 23 and oscillation layer 25 are made of a material such as CoFe, CoNiFe, NiFe, CoZrNb, FeN, FeSi or FeAlSi. They are soft magnetic layers having a relatively high saturated magnetic-flux density and magnetic anisotropy in the longitudinal direction. Alternatively, the spin injection layer 23 and oscillation layer 25 may be CoCr-based magnetic alloy layers magnetized in the longitudinal direction, CoCr-based magnetic layers magnetized in the perpendicular direction, such as CoCrPt layers, CoCrTa layers, CoCrTaPt layers or CoCrTaNb layers, RE-TM amorphous alloy magnetic layers made of, for example, TbFeCo, artificial-lattice magnetic layers made of Co, Pd, Pt, CoCrTa or Pd, magnetic layers made of CoPt-based or FePt-based alloy, or magnetic layers made of SmCo-based alloy excellent in perpendicular alignment property. Otherwise, the spin injection layer 23 and oscillation layer 25 may be composed of layers made of various material specified above, so that they may be adjusted in terms of saturated magnetic-flux density (Ms) and anisotropic magnetic field (Hk).

Further alternatively, the spin injection layer 23 and oscillation layer 25 may be laminated ferri structures, each composed of magnetic layers and non-magnetic metal layers (made of Cu, Pt, Au, Ag, Pd or Ru) or non-magnetic transition-metal layers (made of Cr, Rh, Mo or W) interposed between the magnetic layers, so that the layers made of various materials specified above may be magnetized in antiparallel to one another. Alternatively, the layers made of various materials specified above may be magnetized in parallel, in order to raise the oscillation frequency of the oscillation layer 25 and to magnetize the spin injection layer 23 at high efficiency.

(Configuration of the Write Circuit System)

The write circuit system incorporated in the signal processing system 320 shown in FIG. 3 will be described.

As FIG. 1 shows, the signal processing system 320 has a recording current circuit 30, a recording signal circuit 31, and a drive current controller 32. The recording signal circuit 31 is a circuit included in the read/write channel of the signal processing system 320. The recording signal circuit 31 outputs a recording signal Ws obtained by modulating data to record, to the recording current circuit 30 and drive current controller 32. The recording current circuit 30 and drive current controller 32 are circuits included in the head amplifier (or head driver) of the system 320. The circuits 30 and 32 are integrated in a head IC.

The recording current circuit 30 supplies the excitation coil 13 with a recording current Iw that is synchronous with the change in the recording signal Ws. The main magnetic pole 11 is therefore excited, generating a recording magnetic field that is synchronous with the change in the recording signal Ws. The recording magnetic field is applied to the perpendicular-magnetic recording layer 3 of the disk 1.

The drive current controller 32 generates a drive current Id that is synchronous with the change in the recording signal Ws. The drive current Id is supplied to the STO 20. Driven with the drive current Id supplied from the drive current controller 32, the STO 20 generates a high-frequency magnetic field, which is applied to the perpendicular-magnetic recording layer 3. In FIG. 1, reference numbers 5, 6 and 7 designate the recording current Iw, recording signal Ws and drive current Id, respectively.

The drive current controller 32 may be configured to divide the current that changes in synchronism with the recording signal Ws, into two currents, which are supplied to the STO 20 and the excitation coil 13, respectively. In this case, the recording current circuit 30 can indeed be dispensed with, but more connection terminals must be connected to the drive current controller 32 and the magnetic head 10.

(Advantages)

The advantages of the present embodiment will be explained with reference to FIGS. 5 to 8 and FIGS. 9A to 9D, FIG. 10 and FIGS. 11A to 11D.

FIG. 5 is a diagram that shows a simulation model of the STO 20 which was used to determine the condition in which the STO 20 may operate stably. FIG. 6 is a table showing various factors and components of the simulation model shown in FIG. 5. FIG. 7 is a diagram representing the results of simulation performed on the simulation model. In other words, FIG. 7 illustrates a region in which the STO 20 can stably oscillate when applied with a leakage recording magnetic field and supplied with a drive current.

Figure 8:
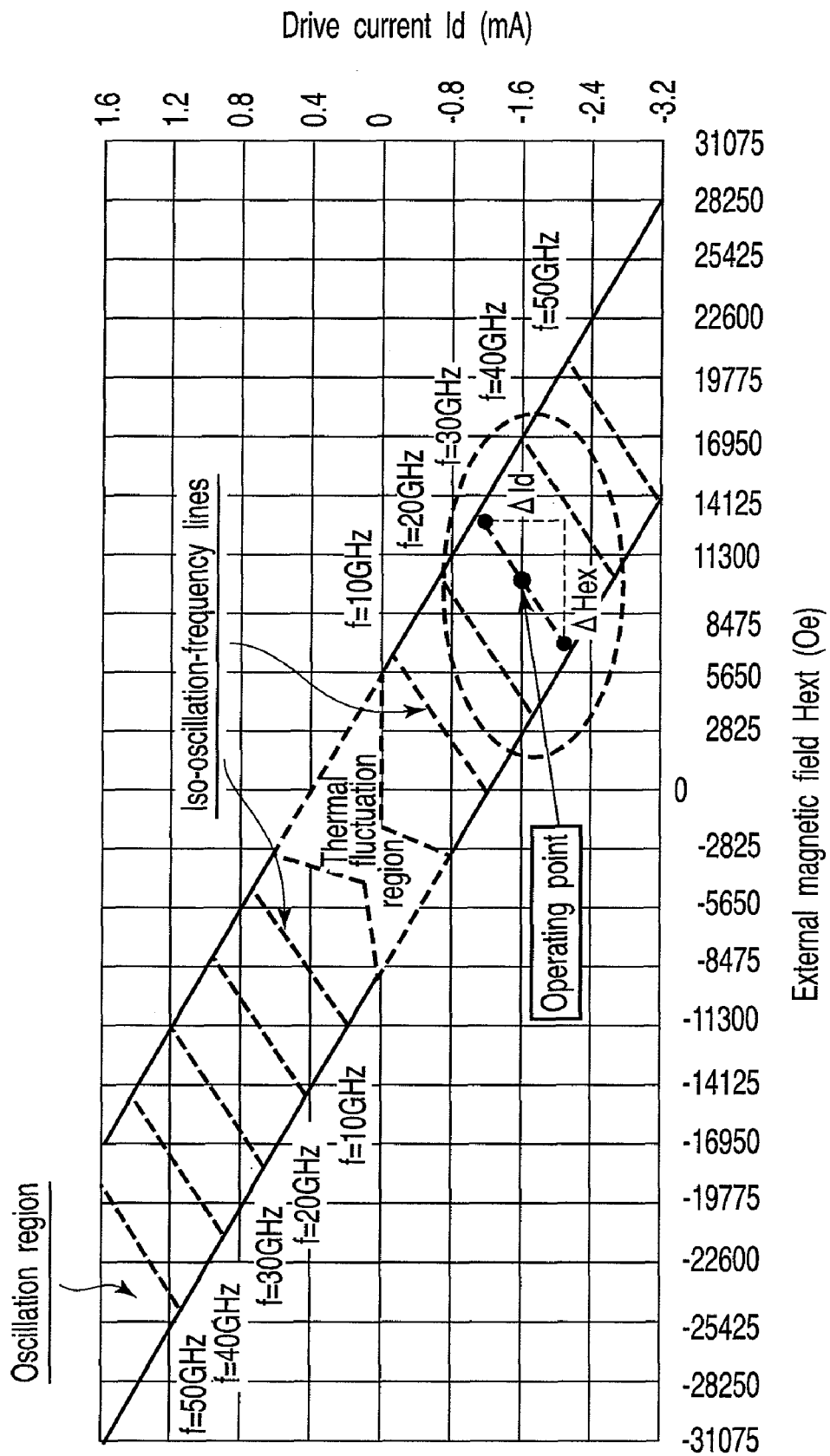
FIG. 8 is a diagram explaining a first method of stabilizing the oscillation frequency of the STO according to the embodiment.
Figure 9:
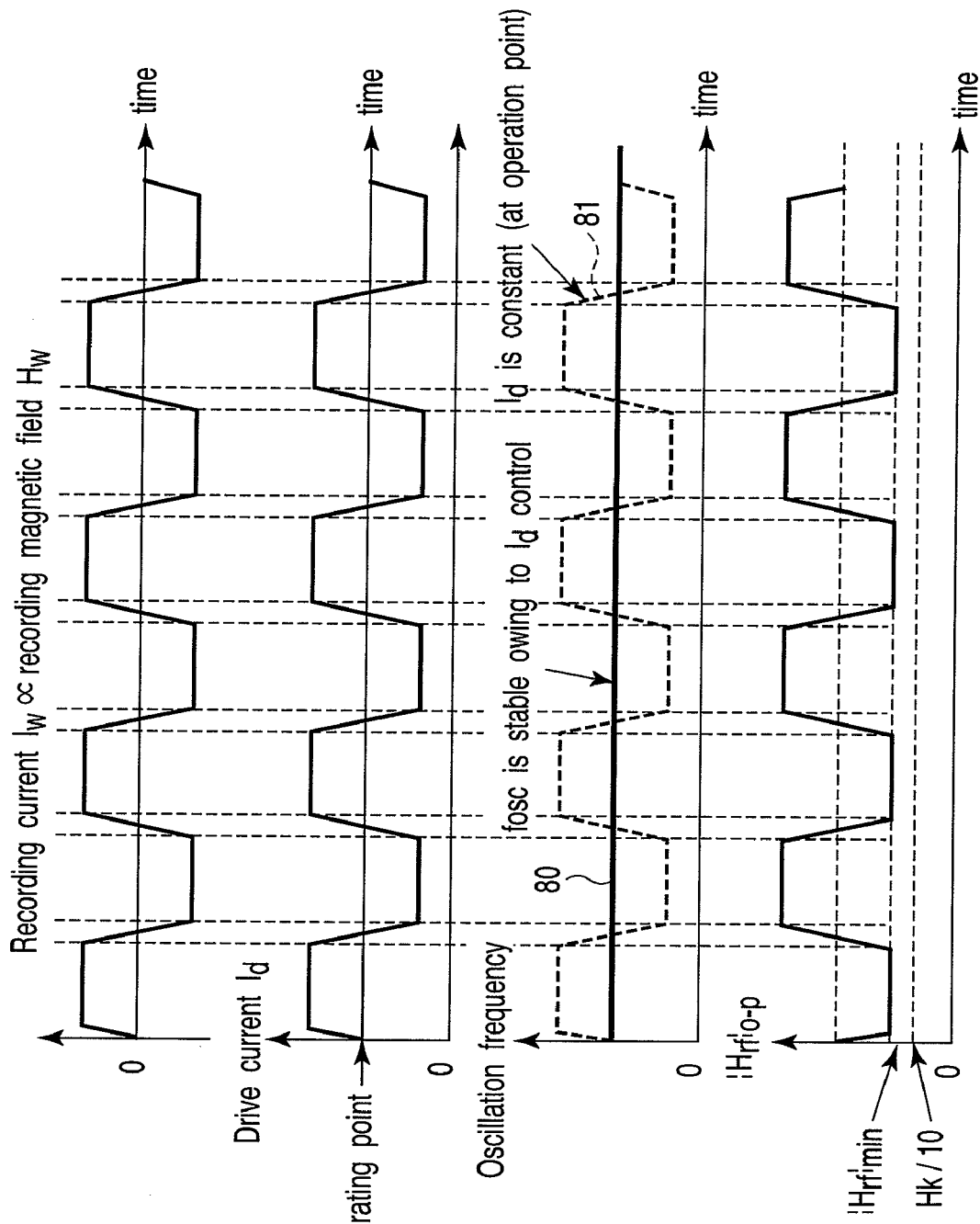
FIGS. 9A to 9D are diagrams showing the relation that the recording current, drive current, oscillation frequency and oscillation high-frequency magnetic field amplitude have with the time response in the method shown in FIG. 8.
Figure 10:
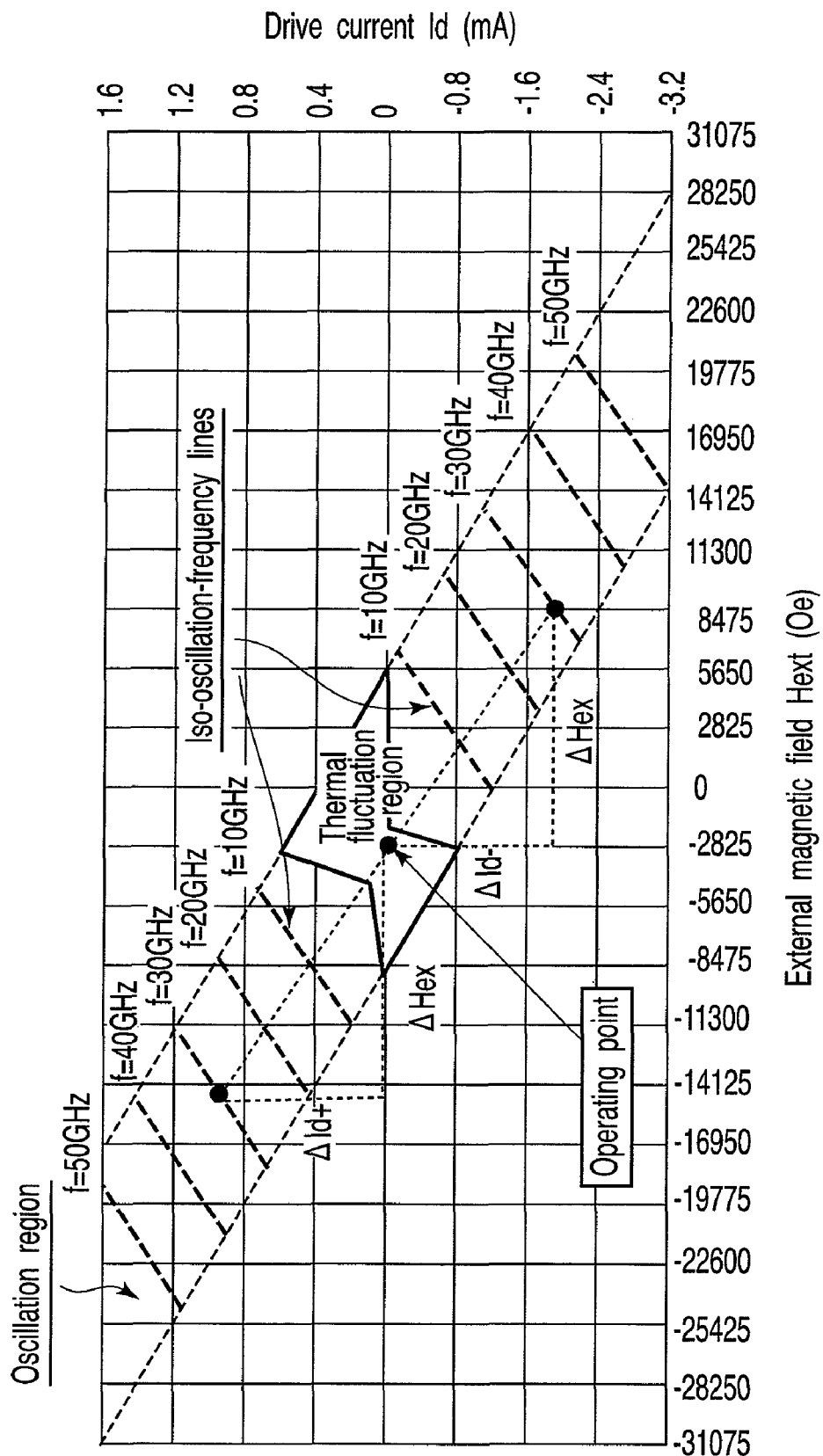
FIG. 10 is a diagram explaining a second method of stabilizing the oscillation frequency of the STO according to the embodiment.

FIG. 8 is a diagram of a first method of stabilizing the oscillation frequency of the STO 20. FIGS. 9A to 9D are diagrams showing the relation that the recording current, drive current, oscillation frequency and oscillation high-frequency magnetic field amplitude have with the time response in the first method of stabilizing the oscillation frequency of the STO 20. FIG. 10 is a diagram explaining a second method of stabilizing the oscillation frequency of the STO 20. FIGS. 11A to 11D are diagrams showing the relation that the recording current, drive current, oscillation frequency and oscillation high-frequency magnetic field amplitude have with the time response in the second method shown in FIG. 10.

To make the magnetic head 10 according to this embodiment perform high frequency assisted writing of high quality, both the high-frequency magnetic field generated by the STO 20 and the recording magnetic field generated by the main magnetic pole 11 must be applied to the same recording part of the disk 1. To apply these magnetic fields to the same recording part, the STO 20 is arranged near the recording magnetic pole, as is illustrated in FIG. 1. When a signal is recorded in the disk 1, the recording magnetic field leaking from the main magnetic pole 11 is applied to the STO 20 as an external magnetic field Hex. As the external magnetic field Hex changes, the oscillation frequency of the STO 20 changes. Inevitably, the STO 20 may operate unstably.

In order to determine the relation between the oscillation frequency of the STO 20, the external magnetic field Hex and the drive current Id, such an STO model as shown in FIG. 5 was simulated by using the Landau-Lifsitz-Gilbert (LLG) equation (i.e., fundamental equation describing a magnetization motion).

As sown in FIG. 5, the STO 20 comprises the oscillator layer 25, non-magnetic layer 24 and spin injection layer 23, which are laid one on another. To record a signal in the disk 1, a drive current Id is supplied to the STO 20 via a pair of electrode layers 21 and 22 shown in FIG. 1. As FIG. 5 shows, the oscillation layer 25 is magnetized in the longitudinal direction, and the spin injection layer 23 is magnetized in the direction the layers 25, 24 and 23 are laid one on another. The physical properties (physical constant, size, and the like) of the components of the STO 20 are shown in the table of FIG. 6.

FIG. 7 is a diagram representing the results of the simulation performed on the simulation model shown in FIG. 5. In FIG. 7, the external magnetic field Hex (equivalent to leakage recording magnetic field) applied to the STO 20 in the direction the layers 25, 24 and 23 are laid one on another is plotted on the abscissa axis, and the drive current Id supplied to the oscillator layer 25 of the STO 29 is plotted on the ordinate axis. In FIG. 7, reference numbers 70a and 70b indicate regions in which the STO 20 operates stably. In any of the other regions shown in FIG. 7, the STO 20 operates unstably or does not operate at all.

Note that in FIG. 7, the drive current Id is graduated in one scale if it is a positive value, and in another scale if it is a negative value. This is because the spin polarization ratio Po varies according to the direction in which the drive current Id flows. In the model of FIG. 5, the spin torque that contributes to the oscillation of the oscillation layer 25 develops from the spins (spin polarization ratio Po of 0.6) that have passed through the spin injection layer 23. If the drive current Id is a negative value, the spin torque that contributes to the oscillation of the oscillation layer 25 will develop from the spins (spin polarization ratio Po of 0.3) that have reflected from the spin injection layer 23. The spin polarization ratio may be constant, in whichever direction the drive current Id flows. In this case, the drive current Id is graduated in one scale, no matter whether it is a positive value or a negative value.

FIG. 8 is a diagram showing lines along which the oscillation frequencies in the stable oscillation regions 70a and 70b, respectively, are equal to each other. (Hereinafter, these lines shall be called "iso-oscillation-frequency lines.") In FIG. 8, the iso-oscillation-frequency lines are slanting broken lines, each having a positive slope.

Assume that the leakage recording magnetic field Hex changes only slightly, not to a value outside the stable oscillation region 70a or 70b. In the simulation model of FIG. 5, an operating point shown in FIG. 8 is so set that the oscillation frequency may be, for example, 30 GHz. The term operating point means a point where a prescribed DC drive current Id and a prescribed DC external magnetic field Hex are applied to perform high-frequency oscillation that can reduce the coercive force at the disk 1.

In the model of FIG. 5 having the operating point so set, the leakage recording magnetic field Hex may vary on the iso-oscillation-frequency lines of 30 GHz, to both a positive value and a negative value from the operating point (by, for example, about 3 kOe or less). If this happens, as the oscillation frequency increases (or decreases), the leakage recording magnetic field Hex increases (or decreases) unless the drive current Id is changed. Therefore, the drive current Id is adjusted and changed at the operating point by value ΔId that is proportional to the change ΔHex in the leakage recording magnetic field Hex. The oscillation frequency can thereby be constant at all times.

This method that can render the oscillation frequency of the STO 20 constant shall be hereinafter called "first method." Assume that in the first method, both the recording current Iw and the drive current Id may have a positive value or a negative value. Then, the waveform of recording current Iw, the waveform of drive current Id, the oscillation frequency f osc of the high-frequency magnetic field emanating from the oscillator layer 25, and the waveform of amplitude |Hrf|o–p have such a relation as illustrated in FIGS. 9A to 9D.

The recording current Iw, drive current Id and oscillation frequency f osc have the relation described above. If the drive current Id decreases, the high-frequency magnetic field will decrease, too, in intensity as shown in FIGS. 9B and 9D. As is known in the art, a high-frequency magnetic field that is about one tenth (1/10) of the anisotropic magnetic field Hk existing on the disk 1 should be applied to the disk 1 in order to accomplish high frequency assisted writing. A high-frequency magnetic field of such intensity, if applied to the disk 1, can induce a sufficient ferromagnetic resonance (precession) on the disk 1, successfully reducing the coercive force Hc. In view of this, it is desired that the design of the head system including the STO 20 and the design of the disk system be optimized to set the minimum value |Hrf|min of the high-frequency magnetic field to one-tenth (1/10) or more of the anisotropic magnetic field Hk existing on the disk 1, thereby, to ultimately accomplish high frequency assisted writing of high quality.

How to stabilize the oscillation frequency of the STO 20 if the oscillation layer 25 of the STO 20 receives an intense leakage recording magnetic field Hex will be explained, with reference to FIG. 10.

In this case, the first method, in which the drive current Id is adjusted, cannot be utilized because the drive current Id cannot remain within any stable-oscillation region if the leakage recording magnetic field Hex is intense. Therefore, in the simulation model of FIG. 5, an operating point is set, where the drive current Id is zero (Id=0) and the leakage recording magnetic field Hex is –2850 Oe, and the oscillation frequency is thereby made constant at 30 GHz. This method of rendering the oscillation frequency constant shall be hereinafter called "second method."

FIGS. 11A to 11D are diagrams showing a relation that the waveform of recording current Iw, the waveform of drive current Id, the oscillation frequency f osc of the high-frequency magnetic field emanating from the oscillator layer 25, and the waveform of amplitude |Hrf|o–p have if both the recording current Iw and the drive current Id have a positive value or a negative value in the second method.

Figure 11:
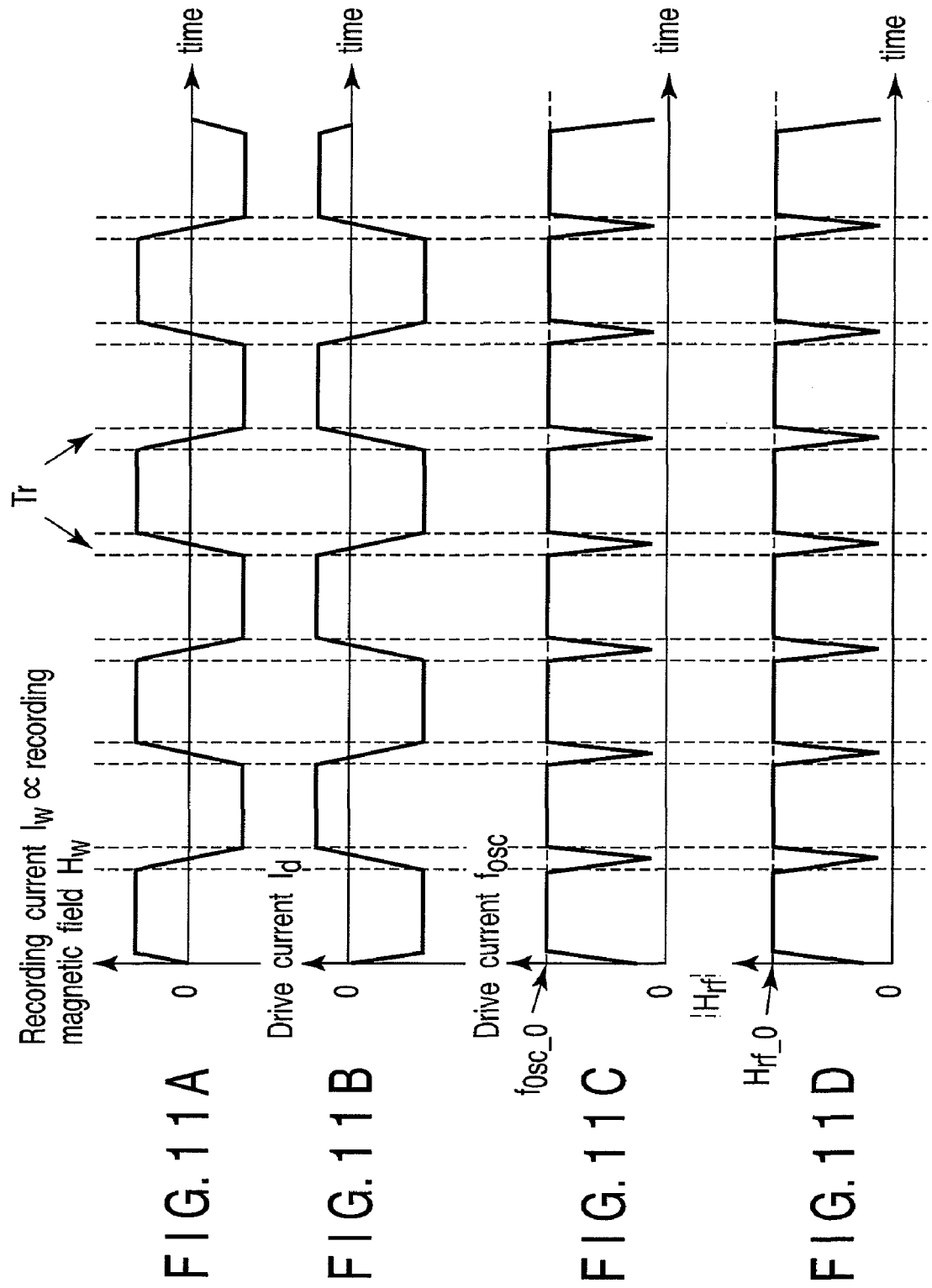
FIGS. 11A to 11D are diagrams showing the relation that the recording current, drive current, oscillation frequency and oscillation high-frequency magnetic field amplitude have with the time response in the second method of stabilizing the oscillation frequency of the STO.

In the model of FIG. 5, in the short transition period when the leakage recording magnetic field Hex undergoes polarity inversion, the frequency and amplitude of the high-frequency magnetic field emanating from the oscillation layer 25 greatly decrease and then greatly increases back to the initial value. In the period when the recording current Iw (i.e., recording magnetic field) remains at a specific value, the frequency and amplitude of the high-frequency magnetic field can remain constant, no matter whether the recording current Iw has a positive value or a negative value. Hence, no problems will arise to hinder the high frequency assisted writing. The second method is characterized in that the drive current Id changes from a positive value to a negative value, or vice versa, when the leakage recording magnetic field Hex applied to the oscillator layer 25 of the STO 20 changes. In FIG. 11A, Tr denotes the polarity-inversion time of the recording current Iw.

Thus, the first embodiment can provide a disk drive that can perform high frequency assisted writing that is stable and high in quality, because the oscillation frequency of the STO 20 remains stable.

Second Embodiment

Figure 12:
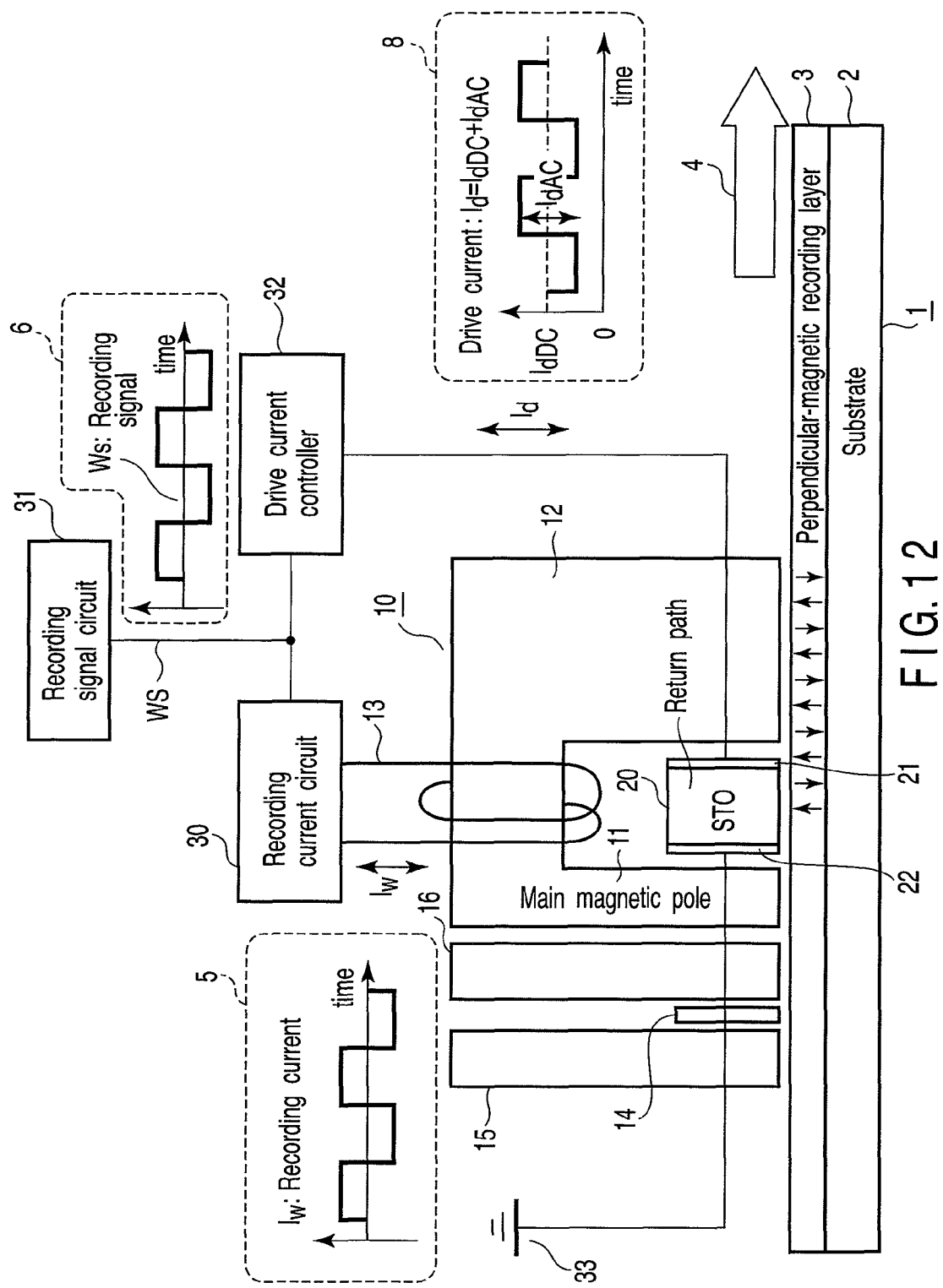
FIG. 12 is a diagram showing the major components of a disk drive according to a second embodiment of the present invention.

FIG. 12 is a diagram showing the major components of a disk drive according to a second embodiment of the present invention. Of the components shown in FIG. 12, those identical to the components shown in FIG. 1 are designated by the same reference numbers and will not be described in detail.

In the first method described above, bias magnetic fields, each having a specific intensity, are applied to the oscillation layer 25 of the STO 20, respectively from the bias layer (layer 25b shown in FIG. 4) and the spin injection layer 23. Therefore, a DC drive current ($Id_{DC}$) of a prescribed value corresponding to the operating point shown in FIG. 8 should be supplied to the oscillation layer 25 to make the layer 25 oscillate at a prescribed frequency even if it is applied with no leakage recording magnetic field Hex from the main magnetic pole 11.

In view of this, the drive current controller 32 is configured to supply a drive current Id (=Id$_{AC}$+Id$_{DC}$) to the STO 20 in the present embodiment. The current Id (=Id$_{AC}$+Id$_{DC}$) has been generated by superposing the DC drive current Id$_{DC}$ on a drive current Id$_{AC}$ that changes along the iso-oscillation-frequency lines mentioned above in synchronism with the changes of the recording signal Ws and recording current Iw.

The recording signal circuit 31 outputs a recording signal Ws to the recording current circuit 30 and drive current controller 32. The recording current circuit 30 supplies a recording current Iw changing in synchronism with the change of the recording signal Ws, to the excitation coil 13. The main magnetic pole 11 is therefore excited, generating a recording magnetic field Hw in synchronism with the recording signal Ws.

In the present embodiment, the drive current controller 32 supplies to the STO 20 a drive current Id superposed with a DC bias. Therefore, the oscillation frequency of the STO 20 will not change even if the leakage recording magnetic field Hw influences the STO 20. The recording part of the disk 1 can therefore be applied with a magnetic field Hrf of a high frequency that is constant at all times. The second embodiment can therefore provide a disk drive that can perform high frequency assisted writing that is stable and high in quality.

Third Embodiment

Figure 13:
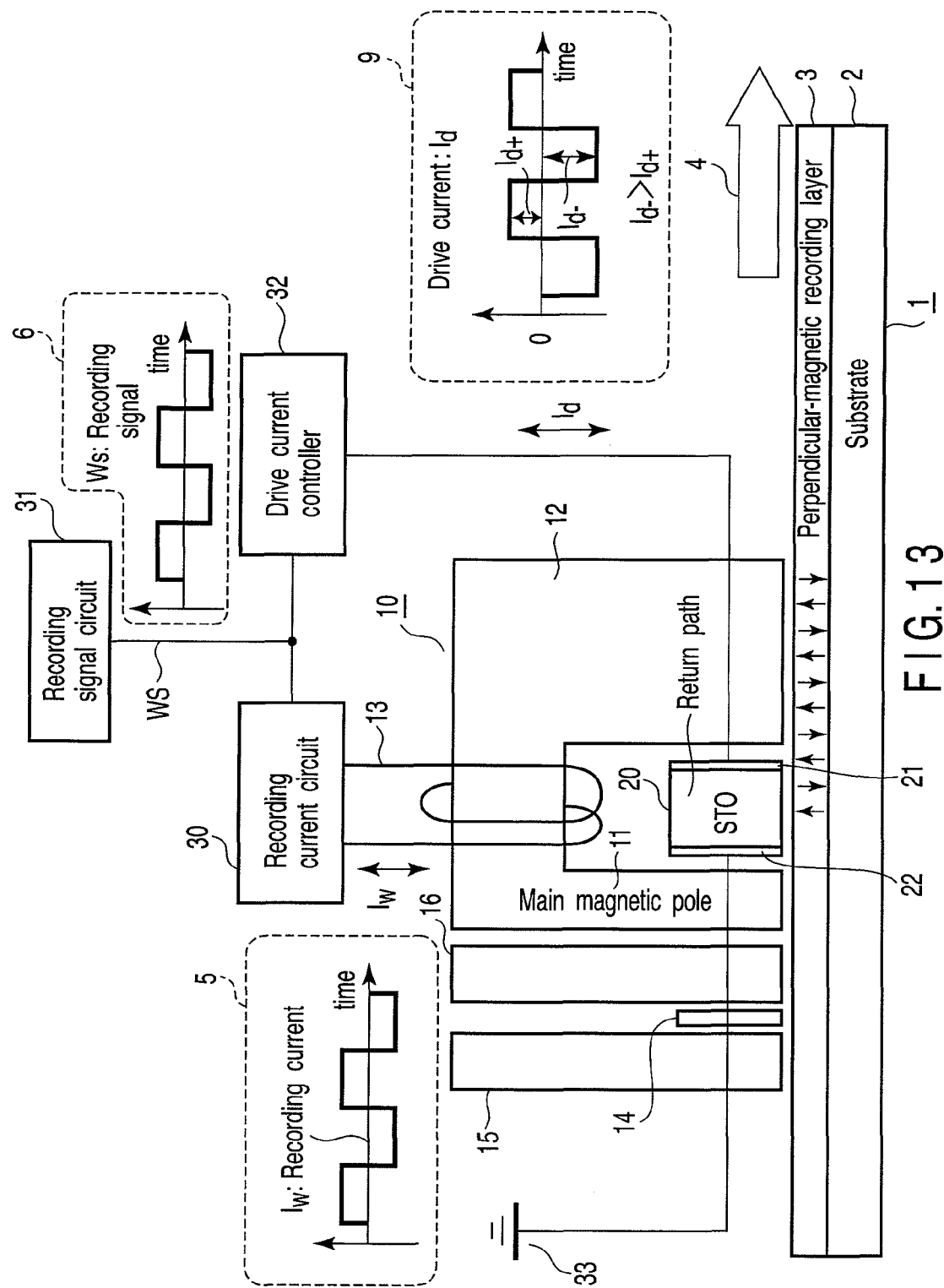
FIG. 13 is a diagram showing the major components of a disk drive according to a third embodiment of the present invention.

FIG. 13 is a diagram showing the major components of a disk drive according to a third embodiment of the present invention. Of the components shown in FIG. 13, those identical to the components shown in FIG. 1 are designated by the same reference numbers and will not be described in detail.

In the second method described above, the drive current Id supplied to the STO 20 must be inverted in polarity in synchronism with the polarity inversion of the recording current Iw in order to stabilize the oscillation frequency of the STO 20. In addition, the drive current Id must be changed in amplitude, depending upon the polarity of the driving current Id.

In the present embodiment, the drive current controller 32 is configured to supply a drive current Id (=Id$_{AC}$+Id$_{DC}$) to the STO 20. The current Id changes in synchronism with the changes of the recording signal Ws and recording current Iw and changes in amplitude in accordance with its polarity.

The recording signal circuit 31 outputs a recording signal Ws to the recording current circuit 30 and drive current controller 32. The recording current circuit 30 supplies a recording current Iw changing in synchronism with the change of the recording signal Ws, to the excitation coil 13. The main magnetic pole 11 is therefore excited, generating a recording magnetic field Hw in synchronism with the recording signal Ws.

In the present embodiment, the drive current controller 32 supplies to the STO 20 a drive current Id that changes in amplitude according to the polarity of the drive current Id. That is, the drive current Id is asymmetrical in amplitude, in accordance with its polarity. Hence, the oscillation frequency of the STO 20 remains stable even if a relatively intense leakage recording magnetic field Hex is applied to the STO 20. The recording part of the disk 1 can therefore be applied with a magnetic field Hrf of a high frequency that is constant at all times. The third embodiment can therefore provide a disk drive that can perform high frequency assisted writing that is stable and high in quality.

Fourth Embodiment

Figure 14:
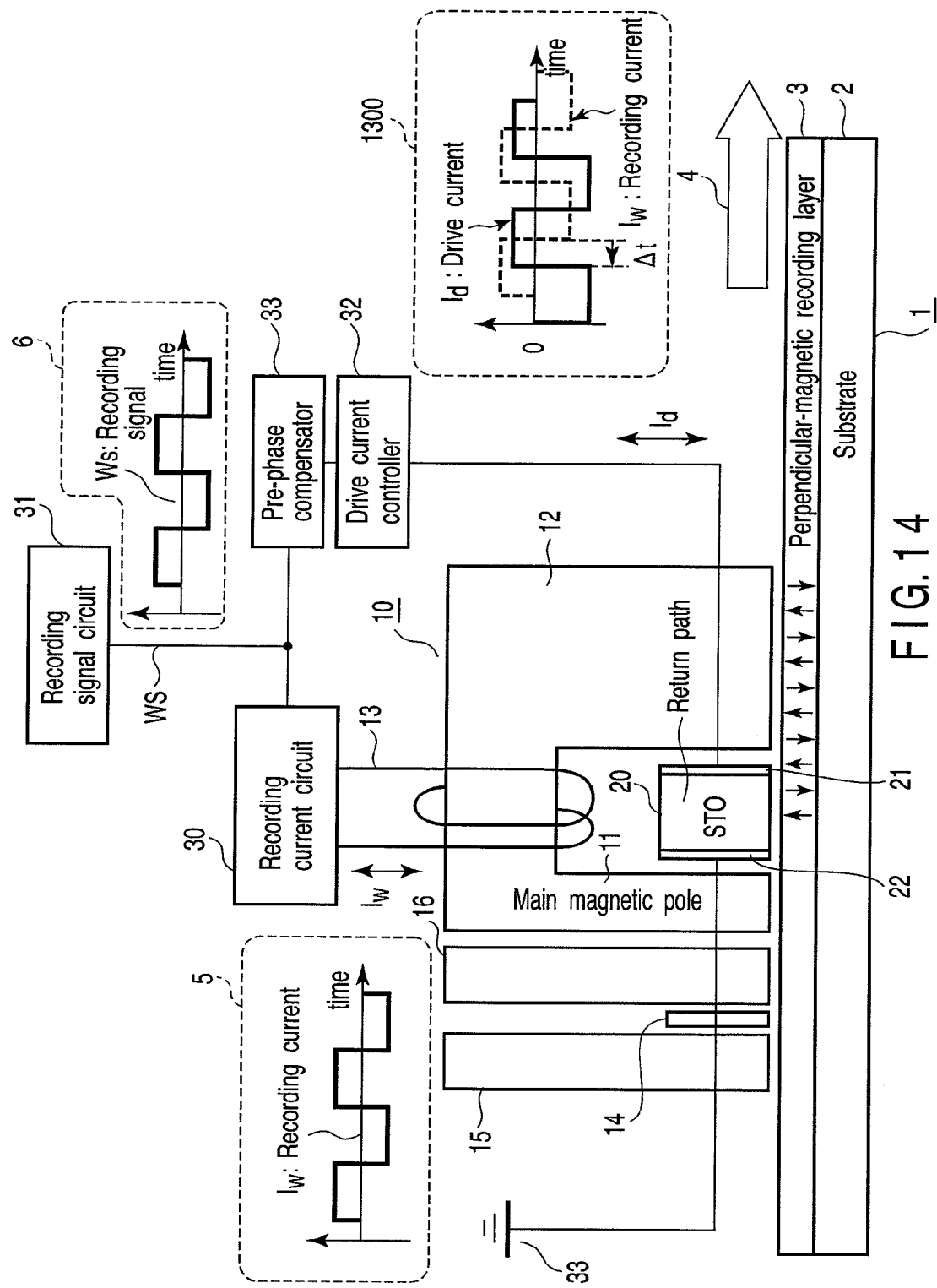
FIG. 14 is a diagram showing the major components of a disk drive according to a third embodiment of the present invention.

FIG. 14 is a diagram showing the major components of a disk drive according to a third embodiment of the present invention. Of the components shown in FIG. 14, those identical to the components shown in FIG. 1 are designated by the same reference numbers and will not be described in detail.

In this embodiment, the recording signal circuit 31 supplies the recording signal Ws not only to the recording current circuit 30, but also to a pre-phase compensator 33. The pre-phase compensator 33 advances the phase of the recording signal Ws by a predetermined time Δt. The recording signal Ws so advanced in phase is output to the drive current controller 32. The drive current controller 32 supplies to the STO 20 a drive current Id that advances in phase by time Δt with respect to the recording current Iw. The main magnetic pole 11 is thereby excited, generating a recording magnetic field Hw in synchronism with the recording signal Ws.

In the fourth embodiment so configured as described above, the STO 20 can apply a high-frequency magnetic field Hrf of a sufficiently high intensity as long as the main magnetic pole 11 applies the recording magnetic field Hw to the disk 1. The fourth embodiment is useful, particularly if the drive current Id changes in synchronism with the polarity inversion of the recording current Iw and a longer time passes until the oscillation frequency of the STO 20 reaches a specific value than the time the recording current Iw requires to undergo polarity inversion. The fourth embodiment can therefore provide a disk drive that can perform high frequency assisted writing that is stable and high in quality.

If necessary, the pre-phase compensator 33 may be so configured to delay the phase of the recording signal Ws advance by a predetermined time Δt, instead of advancing the recording signal Ws as described above.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a magnetic disk;
   a magnetic head comprising a recording magnetic pole, a read head element, and a spin torque oscillator arranged near the recording magnetic pole and configured to perform high frequency assisted writing;
   a current source configured to supply a recording current to a coil for exciting the recording magnetic pole in order to record data magnetically on the magnetic disk; and
   a drive current control module configured to supply a drive current to the spin torque oscillator that changes in synchronism with a polarity inversion of the recording current.

2. The disk drive of claim 1, wherein the drive current control module is configured to superpose a predetermined direct current over the drive current, and to supply the drive current with the direct current to the spin torque oscillator.

3. The disk drive of claim 1, wherein the drive current control module is configured to supply the drive current to the spin torque oscillator, after inverting polarity of the drive current in synchronism with the polarity inversion of the recording current.

4. The disk drive of claim 1, wherein the drive current control module is configured to change amplitude of the drive current in accordance with the polarity of the drive current.

5. The disk drive of claim 1, further comprising a recording-signal outputting module configured to output a recording signal containing data in order to record the data magnetically on the magnetic disk,
wherein the drive current control module is configured to divide a current, changing in synchronism with the recording signal, into two currents, and to supply the two currents to the coil and the spin torque oscillator, respectively.

6. The disk drive of claim 1, wherein the drive current control module is configured to adjust the drive current, thereby to make the spin torque oscillator oscillate at a constant frequency, regardless of the value or polarity of the recording current.

7. The disk drive of claim 1, further comprising a pre-phase compensator configured to either advance or delay the timing of changing the drive current from the timing of inverting the recording current in polarity.

8. The disk drive of claim 2, further comprising a pre-phase compensator configured to either advance or delay the timing of changing the drive current from the timing of inverting the recording current in polarity.

9. A disk drive comprising:
a magnetic disk;
a magnetic head comprising a write head element and a read head element configured to record on the magnetic disk, and to reproduce data from the magnetic disk;
a spin torque oscillator arranged near the recording magnetic pole of the write head element and configured to apply a high-frequency magnetic field to the magnetic disk in order to perform high frequency assisted writing;
a current source configured to supply a recording current to a coil for exciting the recording magnetic pole in order to record data magnetically in the magnetic disk; and
a drive current control module configured to supply a drive current to the spin torque oscillator that changes in synchronism with a polarity inversion of the recording current.

10. The disk drive of claim 9, further comprising a head amplifier configured to amplify a reproduced signal output from the magnetic head, and to supply a recording current to the magnetic head,
wherein the head amplifier comprises the current source and the drive current control module.

11. The disk drive of claim 9, further comprising a read/write channel configured to output a recording signal for recording the data, the recording signal having been generated by modulating the data,
wherein the drive current control module is configured to supply the drive current which is synchronous with the change of the recording signal to the spin torque oscillator.

12. The disk drive of claim 10, further comprising a read/write channel configured to output a recording signal for recording the data, the recording signal having been generated by modulating the data,
wherein the drive current control module is configured to supply the drive current synchronous with the change of the recording signal to the spin torque oscillator.

* * * * *